C. E. ANDERSON.
HAY DISTRIBUTER.
APPLICATION FILED MAY 26, 1917.
1,261,997.
Patented Apr. 9, 1918.
3 SHEETS—SHEET 1.
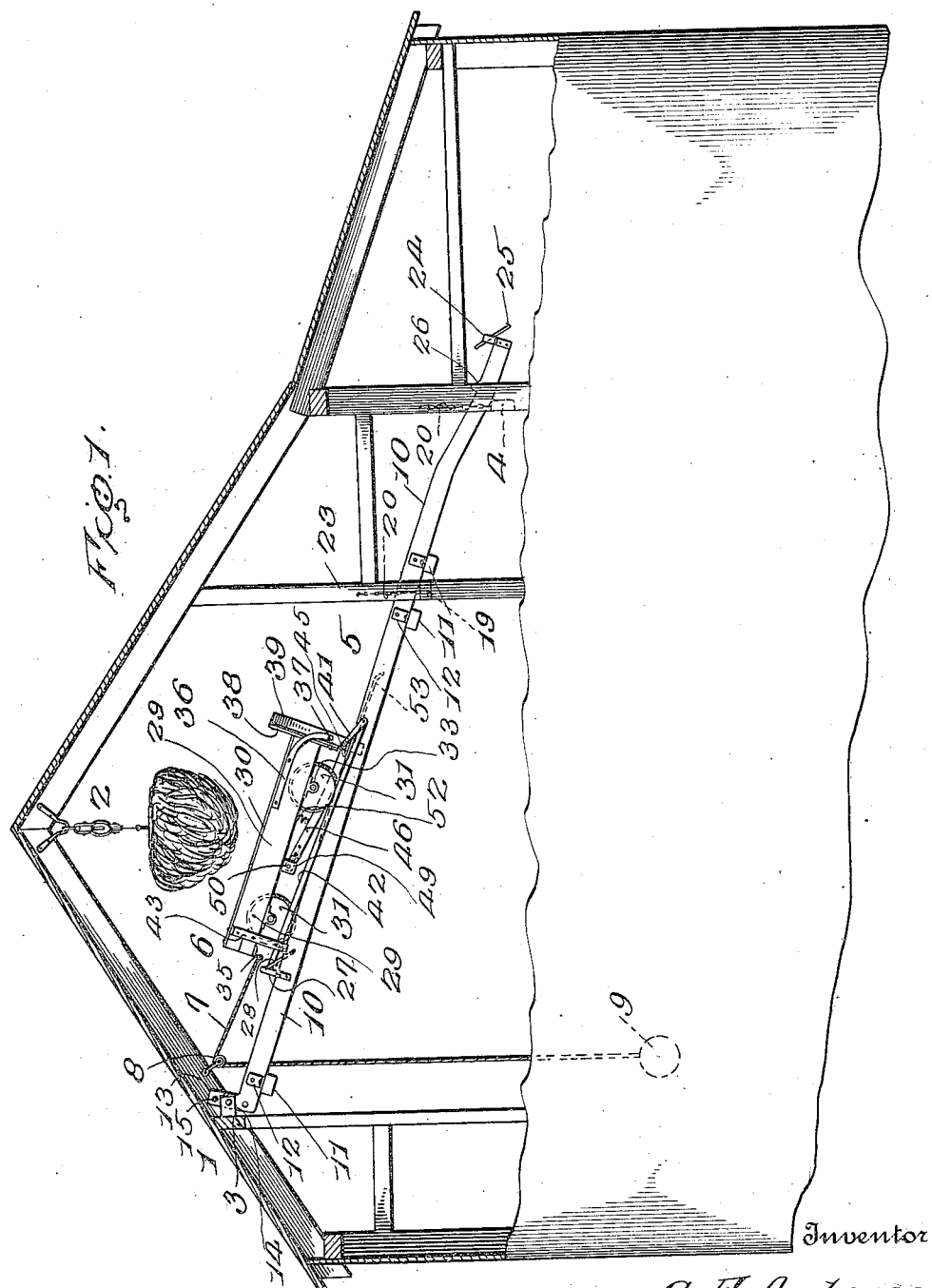

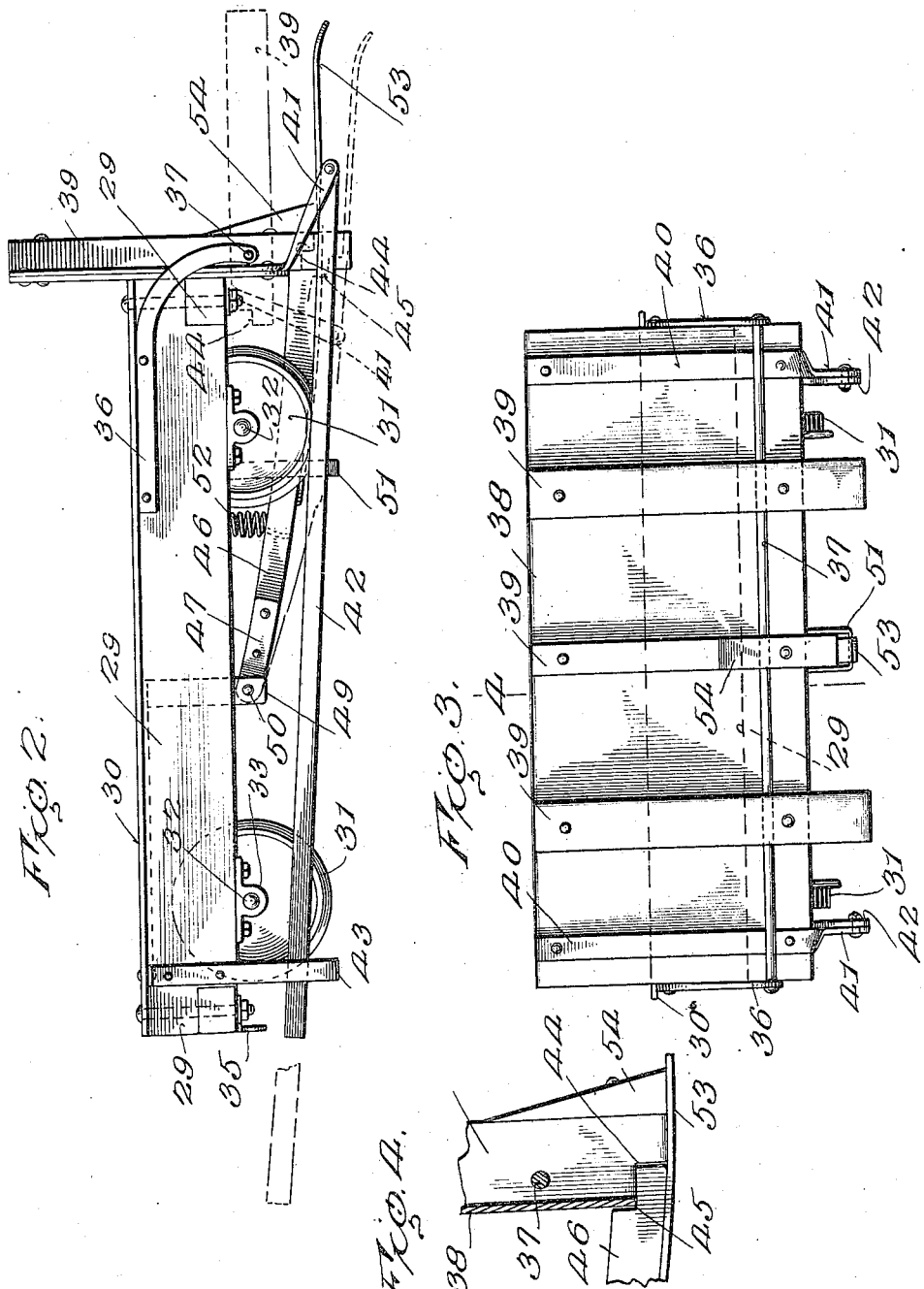

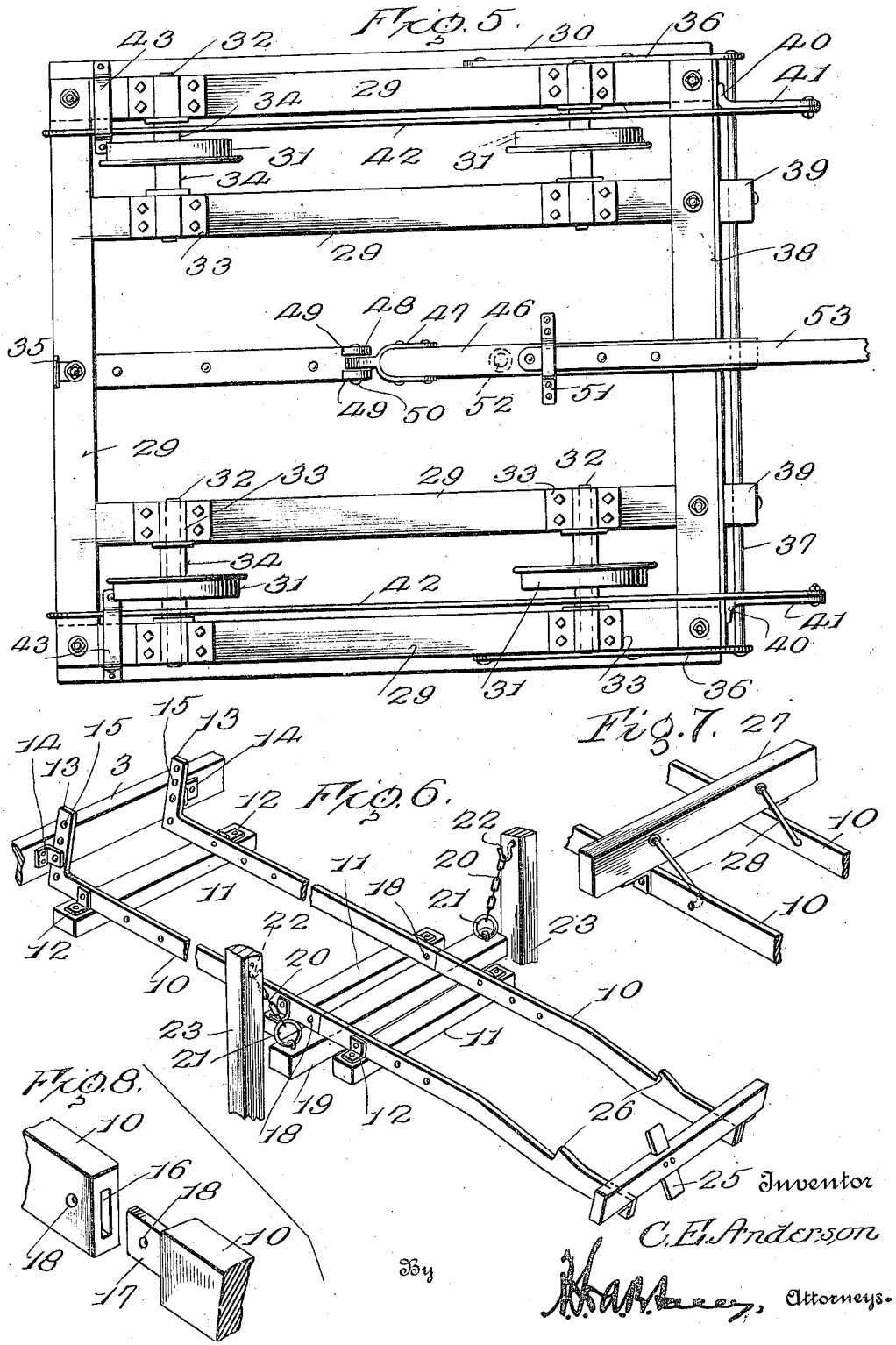

UNITED STATES PATENT OFFICE.

CALVERT E. ANDERSON, OF ROCKPORT, INDIANA.

HAY-DISTRIBUTER.

1,261,997.  Specification of Letters Patent.  Patented Apr. 9, 1918.

Application filed May 26, 1917. Serial No. 171,265.

*To all whom it may concern:*

Be it known that I, CALVERT E. ANDERSON, a citizen of the United States, residing at Rockport, in the county of Spencer and State of Indiana, have invented certain new and useful Improvements in Hay-Distributers, of which the following is a specification.

This invention relates to hay distributers, the object of which is to provide means for distributing hay evenly within a barn. The present invention seeks to provide a simple and automatic apparatus whereby when the load of hay has been released from the grapple it will be carried to the side of the barn and dumped upon the mow or previously dumped hay, the carrier returning automatically to position for receiving another load from the grapple. The invention seeks to provide means whereby the load of hay will be retained upon the carrier until dumping position is reached and the retaining means automatically restored to its normal position when the carrier returns to receive another load. The invention also seeks to provide a strong, durable, and simply constructed track for the carrier.

The invention is illustrated in the accompanying drawings and consists in certain novel features which will be hereinafter first fully described and then more particularly pointed out in the appended claims.

In the drawings:

Figure 1 is a view partly in elevation and partly in section of a barn showing my improved distributer in position therein;

Fig. 2 is a side elevation of the carrier;

Fig. 3 is an end view of the carrier;

Fig. 4 is a detail view of the latch for retaining the end gate in load-engaging position;

Fig. 5 is a bottom plan view of the carrier;

Fig. 6 is a detail perspective view of the track;

Fig. 7 is a detail perspective view of the bumper block;

Fig. 8 is a detail perspective view showing the joint between the rails of the track.

The barn, indicated at 1, may be of any dimensions and of any desired style of architecture. It will preferably be provided with a gable roof and equipped in the apex thereof with a grapple or hay hoist, indicated at 2, it being the function of the grapple or hoist to raise the load of hay from the ground or the wagon in which it is brought to the barn and transport the same along the roof to the point where it is to be distributed. The barn will be equipped with longitudinal beams, as indicated at 3 and 4, and upon these beams transversely of the barn will be supported a track 5, the track being inclined, as shown clearly in Fig. 1, so that the car 6 mounted thereon will ride down the same by gravity. A cable or chain 7 is secured to the rear end of the car and passes over a guide pulley 8 on the roof of the barn, the free end of the cable carrying a weight 9 which will overbalance the car and tend to hold it at the upper limit of its travel.

As shown most clearly in Fig. 6, the track consists of the rails 10 which may be of any desired length and are connected at such intervals as may be deemed advisable by the ties 11. The ties are secured to the rails by right-angular brackets 12 which are fitted in the angles formed by the intersecting surfaces of the ties and the rails and have bolts or other fastening devices inserted through their branches into the ties and the rails respectively. The rails and ties will thus be rigidly secured together so that spreading of the rails will be positively prevented. The upper rails or track sections have their upper extremities turned upwardly, as shown at 13, and these upturned ends bear against the beam 3 of the barn, brackets or lugs 14 being secured upon said beam and bearing against the upturned ends 13 of the rails to receive suitable fastening devices whereby the rails will be secured to the beam. The upturned terminals 13 of the rails will be provided with a plurality of openings 15 so that the track may be adjusted to attain the desired inclination. The meeting ends of the rails are joined in the manner shown in Fig. 8, one of the rails being provided with a mortise or recess 16 to receive a tongue 17 formed upon the end of the meeting rail and openings 18 being formed through the rail and the tongue to receive a transverse retaining pin or bolt so that movement of the rails or track sections relative to each other will be prevented. The rail joints are supported by a beam 19 which is so disposed that the joints will be vertically over the longitudinal medial line of the beam so that bending of the rails at the joints cannot occur. This beam 19 will be supported by chains or similar connections 20 secured in the eyes or rings 21 at the ends of the beam and engaged over hooks 22 upon the posts or other supports 23 within the barn. At the lower end of the track, I provide a cross bar 24 and to said cross bar at the center of the same I secure a tripping device 25 consisting of a plate bolted to the bar and having its surface facing the track inclined downwardly and away from the track so that a trigger upon the car impinging against the trip will be deflected downwardly so as to release an end gate on the car and permit the load to discharge. Near the said cross bar 24 I provide stops or shoulders 26 upon the rails which will be engaged by the wheels of the car and arrest the travel of the same so as to sustain the weight of the car and prevent it running off the end of the track. At a proper point near the upper end of the track, I provide the bumper 27 which is adapted to be engaged by suitable devices on the car to restore the end gate to its normal position as the car returns to the upper limit of its travel. To enable the bumper to withstand the strains placed thereon, I provide braces 28 which have their upper ends secured in the bumper and their lower ends secured in the track rails, as shown clearly in Fig. 7.

The car comprises longitudinal and cross beams 29 which are rigidly secured together at their points of intersection and a floor or platform 30 secured upon the said beams. By reference to Fig. 5 it will be noted that the longitudinal beams are arranged in pairs, the members of which are disposed at and adjacent the sides of the car, and carrying wheels 31 are arranged between the said longitudinal beams, said wheels being of an ordinary flanged type whereby they may run upon and be guided by the rails. The wheels are carried by suitable axles, indicated at 32, journaled in the bearings 33 secured upon the under sides of the beams 29 and flanged spacing sleeves 34 are provided around the axle and at opposite sides of the wheel to maintain the wheels in their proper position longitudinally of the axles.

At the rear end of the car is provided a lug or bracket 35 to which the end of the cable 7 is attached and to the sides of the car at the forward end of the same are secured the supporting arms 36 which extend forwardly and downwardly and have a pivot rod 37 secured in their downturned extremities. An end gate, consisting of a plate or plurality of boards 38 and reinforcing bars or posts 39 secured to the front side of the same, is pivotally mounted upon the rod 37 which passes through the said reinforcements or ribs 39, as shown in the drawings. Straps 40 are secured to the forward face of the end gate near the ends thereof and the lower ends of these straps are twisted forwardly and downwardly forming arms 41 to be pivotally attached to the front ends of the strike links 42 which extend rearwardly from said supporting arms and have their rear ends playing in the keepers or guides 43 secured to and depending from the rear portions of the side beams 29. The middle rib or reinforcing bar 39 has its lower end rabbeted, as shown at 44, to be engaged by the shouldered front end 45 of a latch bar 46 which is pivotally supported at its rear end on the under side of the car. To the rear extremity of the said latch bar, I secure the yoke 47 having a lug 48 fitting between the hangers or ears 49 secured upon the bottom of the car, a pivot pin 50 being inserted through the said lug and ears, as will be readily understood. The intermediate portion of the latch bar 46 plays in a guide or keeper 51 secured to and depending from the bottom of the car and a spring 52 is disposed between and secured to the bottom of the car and the said latch bar so as to normally hold the latch bar in a raised position to engage the shouldered end of the rib 39, as will be readily understood. To the under side of the latch bar, I secure a trigger or tripping finger 53 which projects forwardly from the latch and is adapted to ride against the trip plate 25 in the operation of the apparatus. The guide plates 54 may be secured to the sides of the rib 39 so as to move past the side edges of the trigger and the latch bar when the end gate is released and thereby aid in maintaining the proper relative positions of the end gate and the latch.

It is thought the operation and advantages of my improved mechanism will be readily understood from the foregoing description taken in connection with the accompanying drawings. The weight 9 holds the car normally in the position shown in Fig. 1, directly under the line of travel of the hay grapple. The hay is brought to a point over the car by the grapple and then discharged so as to fall upon the car and will be retained thereon by the end gate. When the hay deposited upon the car is sufficient in weight to overcome the force of the weight 9, the car will roll down the track to the lower end of the same and the trigger or releasing plate 53 will ride against the trip 25 and will be thereby forced downwardly sufficiently to release the latch from the rib 39 whereupon the weight of the load will swing the end gate about the pivot rod 37 to the position shown in dotted lines in Fig. 2, the hay then sliding from the car and being deposited upon the floor of the barn or the previously deposited hay. As soon as the car is relieved of the weight of the hay, the weight 9 will pull the car back to its initial position. When the end gate is swung to the position shown in dotted lines in Fig. 2, the striker links 42 will be moved longitudinally backward, as indicated by dotted lines in said figure. Consequently, as the car reaches the upper limit of its movement, the ends of these striker links will impinge against the bumper 27 and will thereby be forced forwardly so as to push upon the arms 41 and return the end gate to its normal position. The operation is then repeated until the mow has been fully formed.

It will be readily noted that my apparatus is entirely automatic in its operation and is very simple in the arrangement of its parts so that it is not apt to get out of order. When the mow has been fully formed at one point in the barn, the track may be released from the brackets 14 and shifted longitudinally of the beam 3 to a second set of similar brackets and the distribution of the hay performed through the entire barn.

Having thus described the invention, what is claimed as new is:

1. In a hay distributer, the combination of a track, a car mounted to travel by gravity on the track, an end gate mounted for swinging movement at the front end of the car, means on the car for holding the end gate normally raised, means on the track to release the said means and permit the end gate to open, longitudinally movable members mounted on the car and connected at their forward ends to the end gate, and means on the track to actuate said members and move the end gate to closed position.

2. In a hay distributer, the combination of a track, a car mounted to travel by gravity on said track, an end gate pivotally supported at the forward end of the car, a latch carried by the car and normally holding the end gate in raised position, a trip on the track to be engaged by said latch and thereby release the end gate, and coöperating means on the car and the track for returning the end gate to raised position.

3. In a hay distributer, the combination of a track, a car mounted to travel on the track, an end gate pivotally mounted on the forward end of the car, means for releasing said end gate and causing the same to turn downwardly at the lower limit of travel of the car, a bumper on the track at the upper limit of travel of the car, and strikers on the car connected with the end gate adapted to impinge against the said bumper and return the end gate to raised position.

4. In a hay distributer, the combination of a track, a car mounted to travel on the track, an end gate pivotally mounted on the forward end of the car, a latch pivotally mounted on the under side of the car and having its front end engaging the lower end of the end gate whereby to hold the end gate normally in a raised position, a spring connected to the latch and to the car to hold the latch in raised position, a trip on the track at the lower limit of travel of the car, and a trigger secured to the latch and projecting forwardly therefrom to engage said trip.

In testimony whereof I affix my signature.

CALVERT E. ANDERSON. [L. S.]

Copies of this patent may be obtained for five cents each, by addressing the "Commissioner of Patents, Washington, D. C."